US012614392B2

(12) United States Patent
Narayanan et al.

(10) Patent No.: US 12,614,392 B2
(45) Date of Patent: Apr. 28, 2026

(54) FEATURE EXTRACTION AND ALIGNMENT FOR NAVIGATION APPLICATIONS

(71) Applicant: QUALCOMM Incorporated, San Diego, CA (US)

(72) Inventors: Venkatraman Narayanan, Farmington Hills, MI (US); Varun Ravi Kumar, San Diego, CA (US); Senthil Kumar Yogamani, Headford (IE)

(73) Assignee: QUALCOMM Incorporated, San Diego, CA (US)

( * ) Notice: Subject to any disclaimer, the term of this patent is extended or adjusted under 35 U.S.C. 154(b) by 327 days.

(21) Appl. No.: 18/463,709

(22) Filed: Sep. 8, 2023

(65) Prior Publication Data

US 2025/0086977 A1      Mar. 13, 2025

(51) Int. Cl.
*G06V 20/56*      (2022.01)
*G06T 7/33*      (2017.01)
*G06V 10/77*      (2022.01)
*G06V 10/776*      (2022.01)

(52) U.S. Cl.
CPC .............. *G06V 20/56* (2022.01); *G06T 7/337* (2017.01); *G06V 10/7715* (2022.01); *G06V 10/776* (2022.01); *G06T 2207/20081* (2013.01); *G06T 2207/30252* (2013.01)

(58) Field of Classification Search
CPC .. G06V 20/56; G06V 10/7715; G06V 10/776; G06V 10/82; G06T 7/337; G06T 2207/20081; G06T 2207/30252; G06T 2207/20084
USPC ........................................................ 382/104
See application file for complete search history.

(56) References Cited

U.S. PATENT DOCUMENTS

| | | | |
|---|---|---|---|
| 2022/0066456 A1* | 3/2022 | Ebrahimi Afrouzi | ........................ G06F 3/04883 |
| 2024/0312219 A1* | 9/2024 | Choi | ...................... G06V 20/58 |
| 2024/0353231 A1* | 10/2024 | Burlina | .................. G06N 20/20 |
| 2024/0378743 A1 | 11/2024 | Ravi Kumar et al. | |
| 2024/0428448 A1* | 12/2024 | Lin | ............................ G06T 7/74 |
| 2025/0028321 A1* | 1/2025 | Sigurdsson | ............. G10L 13/08 |
| 2025/0078532 A1* | 3/2025 | Zhao | .................... G06V 10/774 |

(Continued)

OTHER PUBLICATIONS

A Self-Calibrating Probabilistic Framework for 3D Environment Perception Using Monocular Vision, b Itu, Razvan, Danescu, Radu Gabriel, Sensors (Basel, Switzerland), 20(5), 1280, Feb. 27, 2020 (Year: 2020).*

*Primary Examiner* — Jennifer Mehmood
*Assistant Examiner* — Heath E. Wells
(74) *Attorney, Agent, or Firm* — Norton Rose Fulbright US LLP/QUALCOMM Incorporated

(57) ABSTRACT

This disclosure provides systems, methods, and devices for processing and aligning sensor data features for navigation. In a first aspect, a method is provided that includes determining, based on received sensor data, a first set of features for an area surrounding the vehicle. A second set of features for the area surrounding the vehicle may be determined based on an occupancy map for the area surrounding the vehicle. A third set of features may be determined that align the first set of features with the second set of features. The third set of features may align each of at least a subset of the second set of features with at least one corresponding feature from the first set of features. Other aspects and features are also claimed and described.

22 Claims, 7 Drawing Sheets

(56) References Cited

U.S. PATENT DOCUMENTS

2025/0157204 A1    5/2025  Narayanan

* cited by examiner

700

DETERMINE, BASED ON RECEIVED SENSOR DATA, A FIRST SET OF
FEATURES FOR AN AREA SURROUNDING A VEHICLE
702

DETERMINE, BASED ON AN OCCUPANCY MAP FOR THE AREA
SURROUNDING THE VEHICLE, A SECOND SET OF FEATURES FOR THE
AREA SURROUNDING THE VEHICLE
704

DETERMINE A THIRD SET OF FEATURES THAT ALIGN THE FIRST SET OF
FEATURES WITH THE SECOND SET OF FEATURES
706

FEATURE EXTRACTION AND ALIGNMENT FOR NAVIGATION APPLICATIONS

TECHNICAL FIELD

Aspects of the present disclosure relate generally to driver-operated or driver-assisted vehicles, and more particularly, to methods and systems suitable for supplying driving assistance or for autonomous driving.

INTRODUCTION

Vehicles take many shapes and sizes, are propelled by a variety of propulsion techniques, and carry cargo including humans, animals, or objects. These machines have enabled the movement of cargo across long distances, movement of cargo at high speed, and movement of cargo that is larger than could be moved by human exertion. Vehicles originally were driven by humans to control speed and direction of the cargo to arrive at a destination. Human operation of vehicles has led to many unfortunate incidents resulting from the collision of vehicle with vehicle, vehicle with object, vehicle with human, or vehicle with animal. As research into vehicle automation has progressed, a variety of driving assistance systems have been produced and introduced. These include navigation directions by GPS, adaptive cruise control, lane change assistance, collision avoidance systems, night vision, parking assistance, and blind spot detection.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Human operators of vehicles can be distracted, which is one factor in many vehicle crashes. Driver distractions can include changing the radio, observing an event outside the vehicle, and using an electronic device, etc. Sometimes circumstances create situations that even attentive drivers are unable to identify in time to prevent vehicular collisions. Aspects of this disclosure, provide improved systems for assisting drivers in vehicles with enhanced situational awareness when driving on a road. Additionally or alternatively, aspects of this disclosure provide improved systems for autonomous or semi-autonomous operation of a vehicle.

Example embodiments provide improved techniques to extract and align features from sensor data for navigation applications (such as navigation of vehicles and other devices). For example, contextual grounding may be performed between a navigation pipeline and a perception module. Contextual grounding may align perception features and navigation features based on relevance to navigation tasks. The alignment may be performed using one or more machine learning models, such as transformer models. For instance, the alignment may be performed using a query, key, value process.

In one aspect, a method includes determining, based on received sensor data, a first set of features for an area surrounding a vehicle. The method also includes determining, based on an occupancy map for the area surrounding the vehicle, a second set of features for the area surrounding the vehicle. The method also includes determining a third set of features that align the first set of features with the second set of features, where the third set of features align each of at least a subset of the second set of features with at least one corresponding feature from the first set of features.

In another aspect, an apparatus includes a memory storing processor-readable code and at least one processor coupled to the memory. The at least one processor may be configured to execute the processor-readable code to cause the at least one processor to perform operations that include determining, based on received sensor data, a first set of features for an area surrounding a vehicle; determining, based on an occupancy map for the area surrounding the vehicle, a second set of features for the area surrounding the vehicle; and determining a third set of features that align the first set of features with the second set of features, where the third set of features align each of at least a subset of the second set of features with at least one corresponding feature from the first set of features.

In an additional aspect, a vehicle includes at least one sensor configured to capture sensor data, a memory storing processor-readable code, and at least one processor coupled to the memory and the at least one sensor. The at least one processor may be configured to execute the processor-readable code to cause the at least one processor to perform operations including determining, based on sensor data from the at least one sensor, a first set of features for an area surrounding the vehicle. The operations also include determining, based on an occupancy map for the area surrounding the vehicle, a second set of features for the area surrounding the vehicle. The operations also include determining a third set of features that align the first set of features with the second set of features, where the third set of features align each of at least a subset of the second set of features with at least one corresponding feature from the first set of features.

In a further aspect, a non-transitory computer-readable medium stores instructions that, when executed by a processor, cause the processor to perform operations that include determining, based on received sensor data, a first set of features for an area surrounding a vehicle. The operations also include determining, based on an occupancy map for the area surrounding the vehicle, a second set of features for the area surrounding the vehicle. The operations also include determining a third set of features that align the first set of features with the second set of features, where the third set of features align each of at least a subset of the second set of features with at least one corresponding feature from the first set of features.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) ng networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). 5G networks include diverse deployments, diverse spectrum, and diverse services and devices that may be implemented using an OFDM-based unified, air interface.

The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur.

Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the below description and examples use the term "device" to describe various aspects of the disclosure, the term "device" is not limited to a specific configuration, type, or number of objects. As used herein, an apparatus may include a device or a portion of the device for performing the described operations.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination.

Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof.

Also, as used herein, the term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

Also, as used herein, relative terms, unless otherwise specified, may be understood to be relative to a reference by a certain amount. For example, terms such as "higher" or "lower" or "more" or "less" may be understood as higher, lower, more, or less than a reference value by a threshold amount.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
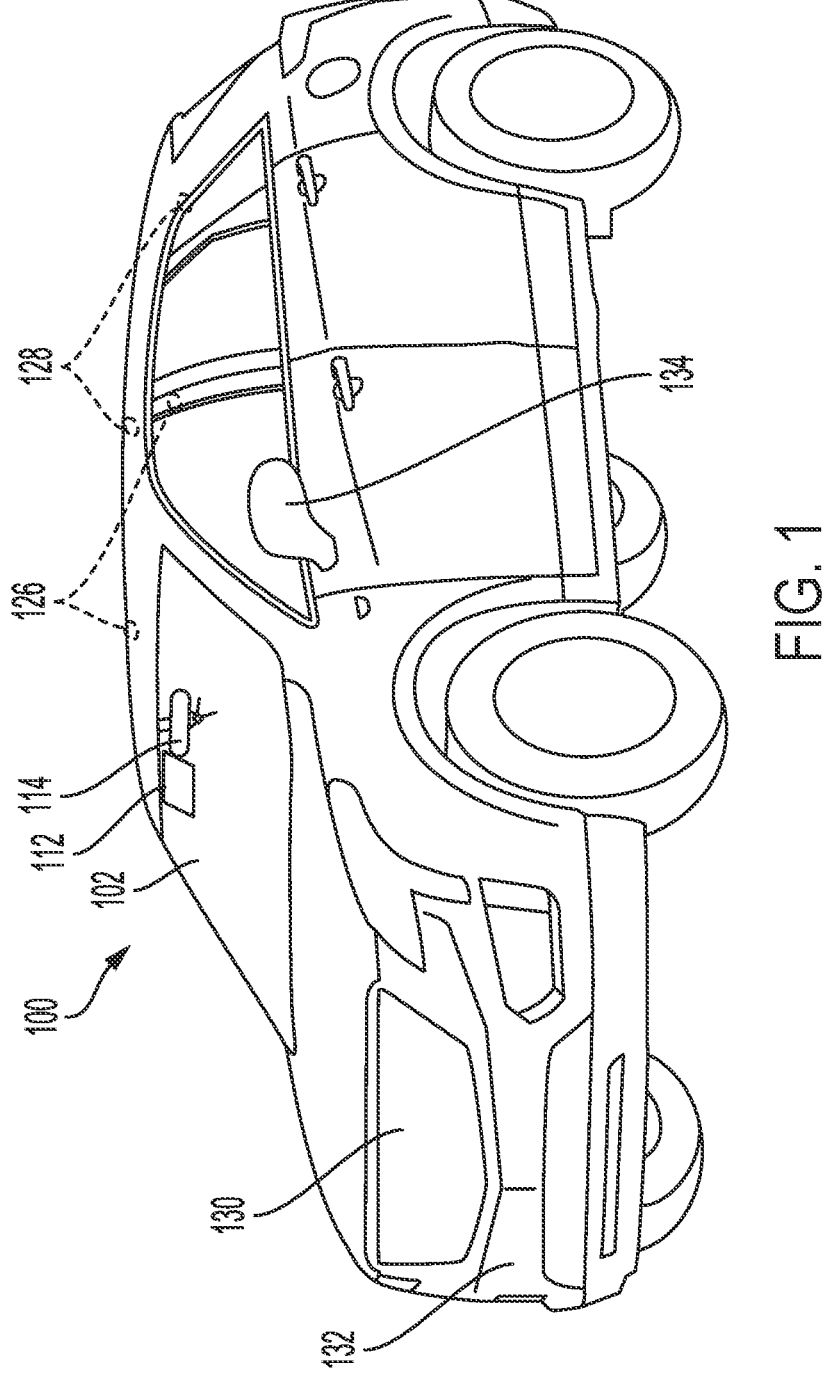
FIG. 1 is a perspective view of a motor vehicle with a driver monitoring system according to embodiments of this disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support sensor data feature extraction and alignment (such as for navigation applications). In many navigation systems, perception tasks (including feature extraction) often follow a linear processing path and may typically be disconnected from navigation processing. As a result, perception processing may typically not be able to focus on objects relevant for navigation, leading to potential inefficiencies or inaccuracies. Some alternative systems may allow bi-directional information flow between navigation and perception processes, such systems may typically not enable the navigation processes to influence perception processes. Such systems are accordingly limited in flexibility and adaptability in real-world driving scenarios, such as with processing pipelines that focus on irrelevant features.

One solution to this problem is to provide contextual grounding from the navigation pipeline to the perception pipeline. Contextual grounding may align perception features and navigation features such that perception processes are able to prioritize parts of a scene that are most relevant to navigation. The crucial aspect of this solution lies in the alignment of features (such as top view features) from perception tasks with corresponding features from navigation tasks. Processing (such as perception processing) may then continue based on the aligned features, enabling perception tasks to better focus on the features most relevant to navigation.

Particular implementations of the subject matter described in this disclosure may be implemented to realize one or more of the following potential advantages or benefits. In some aspects, the present disclosure provides techniques for image processing that may be particularly beneficial in smart vehicle applications. For example, navigation accuracy may be improved because perception features are aligned and prioritized based on their relevance to navigation tasks. Processing efficiency may also be improved, as perception tasks are better able to prioritize relevant features and disregard less relevant features. Such improvements may accordingly reduce processing time, power usage, computing resource utilization, or a combination thereof. Additionally, the proposed techniques are able to integrate sensor data from different types of sensors, different sensor arrangements, and the like, enabling broader applicability of these improvements across different navigation implementations.

One major benefit of improved tracking is that it allows vehicle control systems to more accurately navigate vehicles around obstacles. This can be particularly useful in situations where there may be unexpected obstructions or road conditions that could pose a hazard to drivers. Additionally, improved tracking can help to improve overall safety on the roads by reducing vehicle collisions. With better tracking capabilities, vehicles can be made more responsive to nearby obstacles and can be routed around detected obstacles more efficiently. These improvements can also extend to driver assistance systems, which can benefit from increased monitoring capabilities. By expanding the number, type, and variety of surrounding vehicles that can be detected, these systems can offer more accurate alerts and assistance to drivers when necessary, without generating unnecessary notifications or distractions.

FIG. 1 is a perspective view of a motor vehicle with a driver monitoring system according to embodiments of this disclosure. A vehicle 100 may include a front-facing camera 112 mounted inside the cabin looking through the windshield 102. The vehicle may also include a cabin-facing camera 114 mounted inside the cabin looking towards occupants of the vehicle 100, and in particular the driver of the vehicle 100. Although one set of mounting positions for cameras 112 and 114 are shown for vehicle 100, other mounting locations may be used for the cameras 112 and 114. For example, one or more cameras may be mounted on one of the driver or passenger B pillars 126 or one of the driver or passenger C pillars 128, such as near the top of the pillars 126 or 128. As another example, one or more cameras may be mounted at the front of vehicle 100, such as behind the radiator grill 130 or integrated with bumper 132. As a further example, one or more cameras may be mounted as part of a driver or passenger side mirror assembly 134.

The camera 112 may be oriented such that the field of view of camera 112 captures a scene in front of the vehicle 100 in the direction that the vehicle 100 is moving when in drive mode or forward direction. In some embodiments, an additional camera may be located at the rear of the vehicle 100 and oriented such that the field of view of the additional camera captures a scene behind the vehicle 100 in the direction that the vehicle 100 is moving when in reverse direction. Although embodiments of the disclosure may be described with reference to a "front-facing" camera, referring to camera 112, aspects of the disclosure may be applied similarly to a "rear-facing" camera facing in the reverse direction of the vehicle 100. Thus, the benefits obtained while the operator is driving the vehicle 100 in a forward direction may likewise be obtained while the operator is driving the vehicle 100 in a reverse direction.

Further, although embodiments of the disclosure may be described with reference a "front-facing" camera, referring to camera 112, aspects of the disclosure may be applied similarly to an input received from an array of cameras mounted around the vehicle 100 to provide a larger field of view, which may be as large as 360 degrees around parallel to the ground and/or as large as 360 degrees around a vertical direction perpendicular to the ground. For example, additional cameras may be mounted around the outside of vehicle 100, such as on or integrated in the doors, on or integrated in the wheels, on or integrated in the bumpers, on or integrated in the hood, and/or on or integrated in the roof.

The camera 114 may be oriented such that the field of view of camera 114 captures a scene in the cabin of the vehicle and includes the user operator of the vehicle, and in particular the face of the user operator of the vehicle with sufficient detail to discern a gaze direction of the user operator.

Each of the cameras 112 and 114 may include one, two, or more image sensors, such as including a first image sensor. When multiple image sensors are present, the first image sensor may have a larger field of view (FOV) than the second image sensor or the first image sensor may have different sensitivity or different dynamic range than the second image sensor. In one example, the first image sensor may be a wide-angle image sensor, and the second image sensor may be a telephoto image sensor. In another example, the first sensor is configured to obtain an image through a first lens with a first optical axis and the second sensor is configured to obtain an image through a second lens with a second optical axis different from the first optical axis. Additionally or alternatively, the first lens may have a first magnification, and the second lens may have a second magnification different from the first magnification. This configuration may occur in a camera module with a lens cluster, in which the multiple image sensors and associated lenses are located in offset locations within the camera module. Additional image sensors may be included with larger, smaller, or same fields of view.

Each image sensor may include means for capturing data representative of a scene, such as image sensors (including charge-coupled devices (CCDs), Bayer-filter sensors, infrared (IR) detectors, ultraviolet (UV) detectors, complimentary metal-oxide-semiconductor (CMOS) sensors), and/or time of flight detectors. The apparatus may further include one or more means for accumulating and/or focusing light rays into the one or more image sensors (including simple lenses, compound lenses, spherical lenses, and non-spherical lenses). These components may be controlled to capture the first, second, and/or more image frames. The image frames may be processed to form a single output image frame, such as through a fusion operation, and that output image frame further processed according to the aspects described herein.

As used herein, image sensor may refer to the image sensor itself and any certain other components coupled to the image sensor used to generate an image frame for processing by the image signal processor or other logic circuitry or storage in memory, whether a short-term buffer or longer-term non-volatile memory. For example, an image sensor may include other components of a camera, including a shutter, buffer, or other readout circuitry for accessing individual pixels of an image sensor. The image sensor may further refer to an analog front end or other circuitry for converting analog signals to digital representations for the image frame that are provided to digital circuitry coupled to the image sensor.

Figure 2:
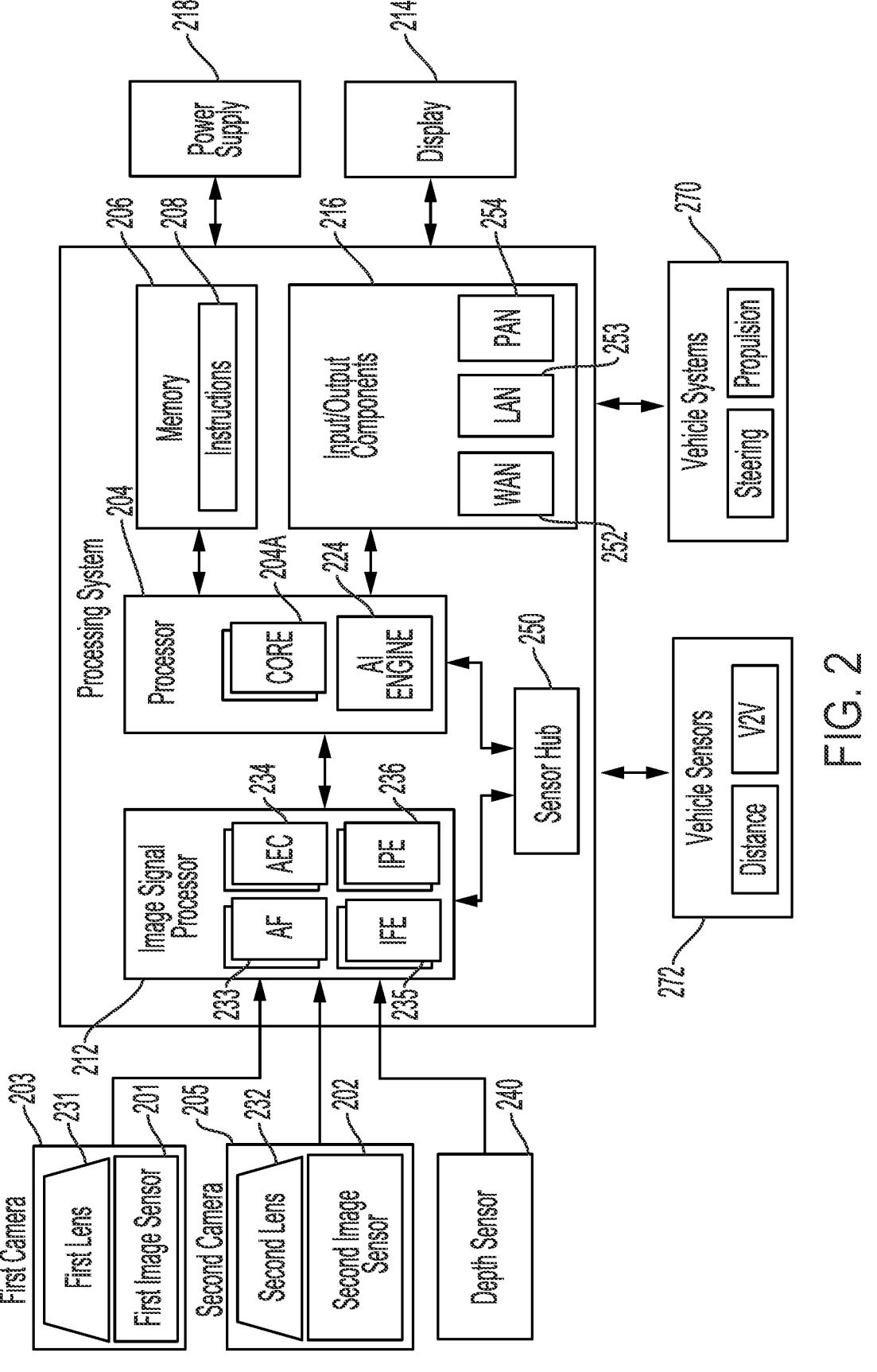
FIG. 2 shows a block diagram of an example image processing configuration for a vehicle according to one or more aspects of the disclosure.

FIG. 2 shows a block diagram of an example image processing configuration for a vehicle according to one or more aspects of the disclosure. The vehicle 100 may include, or otherwise be coupled to, an image signal processor 212 for processing image frames from one or more image sensors, such as a first image sensor 201, a second image sensor 202, and a depth sensor 240. In some implementations, the vehicle 100 also includes or is coupled to a processor (e.g., CPU) 204 and a memory 206 storing instructions 208. The vehicle 100 may also include or be coupled to a display 214 and input/output (I/O) components 216. I/O components 216 may be used for interacting with a user, such as a touch screen interface and/or physical buttons. I/O components 216 may also include network interfaces for communicating with other devices, such as other vehicles, an operator's mobile devices, and/or a remote monitoring system. The network interfaces may include one or more of a wide area network (WAN) adaptor 252, a local area network (LAN) adaptor 253, and/or a personal area network (PAN) adaptor 254. An example WAN adaptor 252 is a 4G LTE or a 5G NR wireless network adaptor. An example LAN adaptor 253 is an IEEE 802.11 WiFi wireless network adapter. An example PAN adaptor 254 is a Bluetooth wireless network adaptor. Each of the adaptors 252, 253, and/or 254 may be coupled to an antenna, including multiple antennas configured for primary and diversity reception and/or configured for receiving specific frequency bands. The vehicle 100 may further include or be coupled to a power supply 218, such as a battery or an alternator. The vehicle 100 may also include or be coupled to additional features or components that are not shown in FIG. 2. In one example, a wireless interface, which may include one or more transceivers and associated baseband processors, may be coupled to or included in WAN adaptor 252 for a wireless communication device. In a further example, an analog front end (AFE) to convert analog image frame data to digital image frame data may be coupled between the image sensors 201 and 202 and the image signal processor 212.

The vehicle 100 may include a sensor hub 250 for interfacing with sensors to receive data regarding movement of the vehicle 100, data regarding an environment around the vehicle 100, and/or other non-camera sensor data. One example non-camera sensor is a gyroscope, a device configured for measuring rotation, orientation, and/or angular velocity to generate motion data. Another example non-camera sensor is an accelerometer, a device configured for measuring acceleration, which may also be used to determine velocity and distance traveled by appropriately integrating the measured acceleration, and one or more of the acceleration, velocity, and or distance may be included in generated motion data. In further examples, a non-camera sensor may be a global positioning system (GPS) receiver, a light detection and ranging (LiDAR) system, a radio detection and ranging (RADAR) system, or other ranging systems. For example, the sensor hub 250 may interface to a vehicle bus for sending configuration commands and/or receiving information from vehicle sensors 272, such as distance (e.g., ranging) sensors or vehicle-to-vehicle (V2V) sensors (e.g., sensors for receiving information from nearby vehicles).

The image signal processor (ISP) 212 may receive image data, such as used to form image frames. In one embodiment, a local bus connection couples the image signal processor 212 to image sensors 201 and 202 of a first camera 203, which may correspond to camera 112 of FIG. 1, and second camera 205, which may correspond to camera 114 of FIG. 1, respectively. In another embodiment, a wire interface may couple the image signal processor 212 to an external image sensor. In a further embodiment, a wireless interface may couple the image signal processor 212 to the image sensor 201, 202.

The first camera 203 may include the first image sensor 201 and a corresponding first lens 231. The second camera 205 may include the second image sensor 202 and a corresponding second lens 232. Each of the lenses 231 and 232 may be controlled by an associated autofocus (AF) algorithm 233 executing in the ISP 212, which adjust the lenses 231 and 232 to focus on a particular focal plane at a certain scene depth from the image sensors 201 and 202. The AF algorithm 233 may be assisted by depth sensor 240. In some embodiments, the lenses 231 and 232 may have a fixed focus.

The first image sensor 201 and the second image sensor 202 are configured to capture one or more image frames. Lenses 231 and 232 focus light at the image sensors 201 and 202, respectively, through one or more apertures for receiving light, one or more shutters for blocking light when outside an exposure window, one or more color filter arrays (CFAs) for filtering light outside of specific frequency ranges, one or more analog front ends for converting analog measurements to digital information, and/or other suitable components for imaging.

In some embodiments, the image signal processor 212 may execute instructions from a memory, such as instructions 208 from the memory 206, instructions stored in a separate memory coupled to or included in the image signal processor 212, or instructions provided by the processor 204. In addition, or in the alternative, the image signal processor 212 may include specific hardware (such as one or more integrated circuits (ICs)) configured to perform one or more operations described in the present disclosure. For example, the image signal processor 212 may include one or more image front ends (IFEs) 235, one or more image post-processing engines (IPEs) 236, and or one or more auto exposure compensation (AEC) 234 engines. The AF 233, AEC 234, IFE 235, IPE 236 may each include application-specific circuitry, be embodied as software code executed by the ISP 212, and/or a combination of hardware within and software code executing on the ISP 212.

In some implementations, the memory 206 may include a non-transient or non-transitory computer readable medium storing computer-executable instructions 208 to perform all or a portion of one or more operations described in this disclosure. In some implementations, the instructions 208 include a camera application (or other suitable application) to be executed during operation of the vehicle 100 for generating images or videos. The instructions 208 may also include other applications or programs executed for the vehicle 100, such as an operating system, mapping applications, or entertainment applications. Execution of the camera application, such as by the processor 204, may cause the vehicle 100 to generate images using the image sensors 201 and 202 and the image signal processor 212. The memory 206 may also be accessed by the image signal processor 212 to store processed frames or may be accessed by the processor 204 to obtain the processed frames. In some embodiments, the vehicle 100 includes a system on chip (SoC) that incorporates the image signal processor 212, the processor 204, the sensor hub 250, the memory 206, and input/output components 216 into a single package.

In some embodiments, at least one of the image signal processor 212 or the processor 204 executes instructions to perform various operations described herein, including object detection, risk map generation, driver monitoring, and driver alert operations. For example, execution of the instructions can instruct the image signal processor 212 to begin or end capturing an image frame or a sequence of image frames. In some embodiments, the processor 204 may include one or more general-purpose processor cores 204A capable of executing scripts or instructions of one or more software programs, such as instructions 208 stored within the memory 206. For example, the processor 204 may include one or more application processors configured to execute the camera application (or other suitable application for generating images or video) stored in the memory 206.

In executing the camera application, the processor 204 may be configured to instruct the image signal processor 212 to perform one or more operations with reference to the image sensors 201 or 202. For example, the camera application may receive a command to begin a video preview display upon which a video comprising a sequence of image frames is captured and processed from one or more image sensors 201 or 202 and displayed on an informational display on display in the cabin of the vehicle 100.

In some embodiments, the processor 204 may include ICs or other hardware (e.g., an artificial intelligence (AI) engine 224) in addition to the ability to execute software to cause the vehicle 100 to perform a number of functions or operations, such as the operations described herein. In some other embodiments, the vehicle 100 does not include the processor 204, such as when all of the described functionality is configured in the image signal processor 212.

In some embodiments, the display 214 may include one or more suitable displays or screens allowing for user interaction and/or to present items to the user, such as a preview of the image frames being captured by the image sensors 201 and 202. In some embodiments, the display 214 is a touch-sensitive display. The I/O components 216 may be or include any suitable mechanism, interface, or device to receive input (such as commands) from the user and to provide output to the user through the display 214. For example, the I/O components 216 may include (but are not limited to) a graphical user interface (GUI), a keyboard, a mouse, a microphone, speakers, a squeezable bezel, one or more buttons (such as a power button), a slider, a switch, and so on. In some embodiments involving autonomous driving, the I/O components 216 may include an interface to a vehicle's bus for providing commands and information to and receiving information from vehicle systems 270 including propulsion (e.g., commands to increase or decrease speed or apply brakes) and steering systems (e.g., commands to turn wheels, change a route, or change a final destination).

While shown to be coupled to each other via the processor 204, components (such as the processor 204, the memory 206, the image signal processor 212, the display 214, and the I/O components 216) may be coupled to each another in other various arrangements, such as via one or more local buses, which are not shown for simplicity. While the image signal processor 212 is illustrated as separate from the processor 204, the image signal processor 212 may be a core of a processor 204 that is an application processor unit (APU), included in a system on chip (SoC), or otherwise included with the processor 204. While the vehicle 100 is referred to in the examples herein for including aspects of the present disclosure, some device components may not be shown in FIG. 2 to prevent obscuring aspects of the present disclosure. Additionally, other components, numbers of components, or combinations of components may be included in a suitable vehicle for performing aspects of the present disclosure. As such, the present disclosure is not limited to a specific device or configuration of components, including the vehicle 100.

Figure 3:
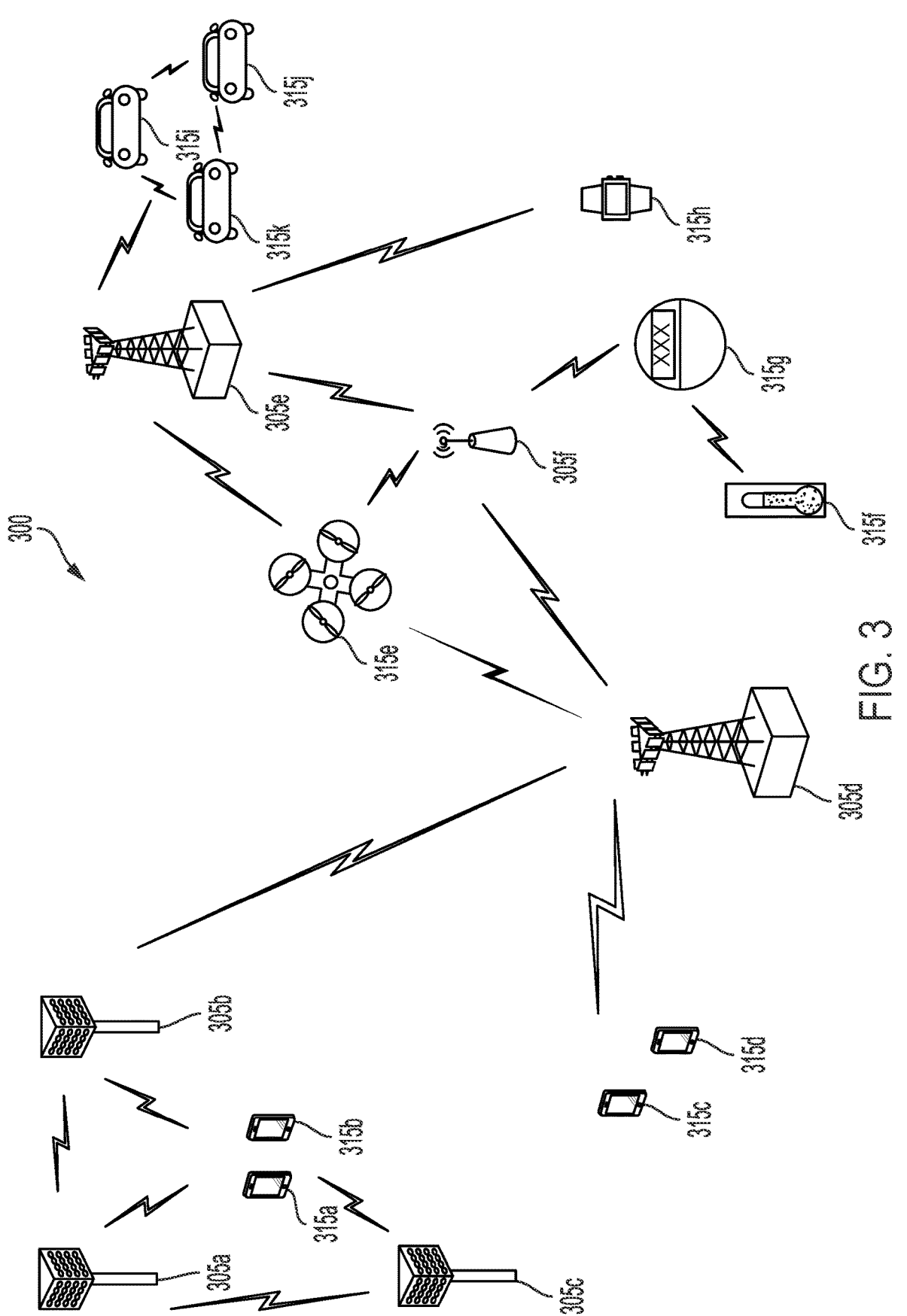
FIG. 3 is a block diagram illustrating details of an example wireless communication system according to one or more aspects.

The vehicle 100 may communicate as a user equipment (UE) within a wireless network 300, such as through WAN adaptor 252, as shown in FIG. 3. FIG. 3 is a block diagram illustrating details of an example wireless communication system according to one or more aspects. Wireless network 300 may, for example, include a 5G wireless network. As appreciated by those skilled in the art, components appearing in FIG. 3 are likely to have related counterparts in other network arrangements including, for example, cellular-style network arrangements and non-cellular-style-network arrangements (e.g., device-to-device or peer-to-peer or ad-hoc network arrangements, etc.).

Wireless network 300 illustrated in FIG. 3 includes base stations 305 and other network entities. A base station may be a station that communicates with the UEs and may also be referred to as an evolved node B (eNB), a next generation eNB (gNB), an access point, and the like. Each base station 305 may provide communication coverage for a particular geographic area. In 3GPP, the term "cell" may refer to this particular geographic coverage area of a base station or a base station subsystem serving the coverage area, depending on the context in which the term is used. In implementations of wireless network 300 herein, base stations 305 may be associated with a same operator or different operators (e.g., wireless network 300 may include a plurality of operator wireless networks). Additionally, in implementations of wireless network 300 herein, base station 305 may provide wireless communications using one or more of the same frequencies (e.g., one or more frequency bands in licensed spectrum, unlicensed spectrum, or a combination thereof) as a neighboring cell. In some examples, an individual base station 305 or UE 315 may be operated by more than one network operating entity. In some other examples, each base station 305 and UE 315 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 3, base stations 305*d* and 305*e* are regular macro base stations, while base stations 305*a*-305*c* are macro base stations enabled with one of three-dimension (3D), full dimension (FD), or massive MIMO. Base stations 305*a*-305*c* take advantage of their higher dimension MIMO capabilities to exploit 3D beamforming in both elevation and azimuth beamforming to increase coverage and capacity. Base station 305*f* is a small cell base station which may be a home node or portable access point. A base station may support one or multiple (e.g., two, three, four, and the like) cells.

Wireless network 300 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 315 are dispersed throughout the wireless network 300, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology.

Some non-limiting examples of a mobile apparatus, such as may include implementations of one or more of UEs 315, include a mobile, a cellular (cell) phone, a smart phone, a session initiation protocol (SIP) phone, a wireless local loop (WLL) station, a laptop, a personal computer (PC), a notebook, a netbook, a smart book, a tablet, a personal digital assistant (PDA), and a vehicle. Although UEs 315*a-j* are specifically shown as vehicles, a vehicle may employ the communication configuration described with reference to any of the UEs 315*a*-315*k*.

In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 315*a*-315*d* of the implementation illustrated in FIG. 3 are examples of mobile smart phone-type devices accessing wireless network 300. A UE may also be a machine specifically configured for connected communication, including machine type communication (MTC), enhanced MTC (eMTC), narrowband IoT (NB-IoT) and the like. UEs 315*e*-315*k* illustrated in FIG. 3 are examples of various machines configured for communication that access wireless network 300.

A mobile apparatus, such as UEs 315, may be able to communicate with any type of the base stations, whether macro base stations, pico base stations, femto base stations, relays, and the like. In FIG. 3, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 300 may occur using wired or wireless communication links.

In operation at wireless network 300, base stations 305*a*-305*c* serve UEs 315*a* and 315*b* using 3D beamforming and coordinated spatial techniques, such as coordinated multipoint (CoMP) or multi-connectivity. Macro base station 305*d* performs backhaul communications with base stations 305*a*-305*c*, as well as small cell, base station 305*f*. Macro base station 305*d* also transmits multicast services which are subscribed to and received by UEs 315*c* and 315*d*. Such multicast services may include mobile television or stream video, or may include other services for providing community information, such as weather emergencies or alerts, such as Amber alerts or gray alerts.

Wireless network 300 of implementations supports mission critical communications with ultra-reliable and redundant links for mission critical devices, such UE 315*e*, which is a drone. Redundant communication links with UE 315*e* include from macro base stations 305*d* and 305*e*, as well as small cell base station 305*f*. Other machine type devices, such as UE 315*f* (thermometer), UE 315*g* (smart meter), and UE 315*h* (wearable device) may communicate through wireless network 300 either directly with base stations, such as small cell base station 305*f*, and macro base station 305*e*, or in multi-hop configurations by communicating with another user device which relays its information to the network, such as UE 315*f* communicating temperature measurement information to the smart meter, UE 315*g*, which is then reported to the network through small cell base station 305*f*. Wireless network 300 may also provide additional network efficiency through dynamic, low-latency TDD communications or low-latency FDD communications, such as in a vehicle-to-vehicle (V2V) mesh network between UEs 315*i*-315*k* communicating with macro base station 305*e*.

Aspects of the systems described with reference to, and shown in, FIG. 1, FIG. 2, and FIG. 3 may include extracting and aligning features from various sensors (such as image sensors, position sensors, inertial measurement units (IMUs), and the like).

Figure 4:
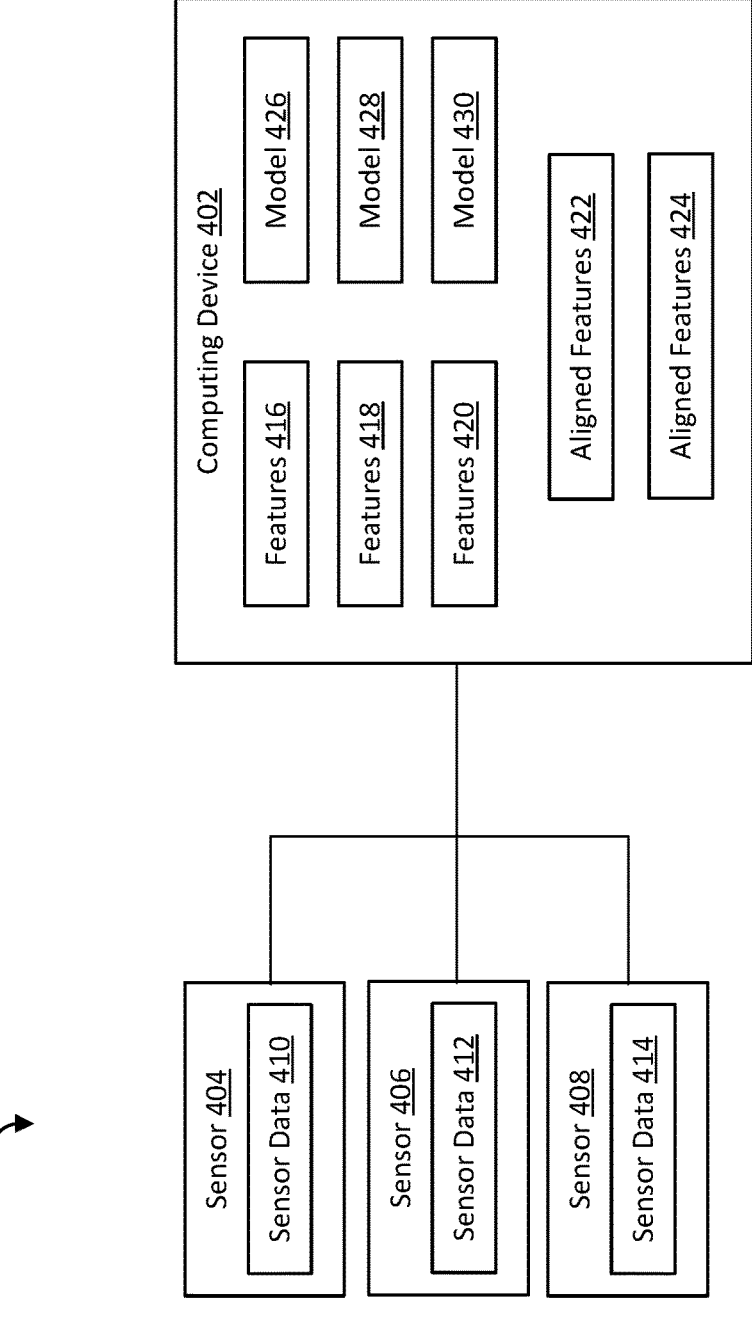
FIG. 4 is a block diagram illustrating a system for feature extraction and alignment according to one or more aspects of the disclosure.

FIG. 4 is a block diagram illustrating a system 400 for feature extraction and alignment according to one aspect of the present disclosure. The system 400 includes sensors 404, 406, 408 and a computing device 402. The sensors 404, 406, 408 include sensor data 410, 412, 414. The computing device 402 includes a first set of features 416, a second set of features 418, a third set of features 420, a first machine learning model 426, a second machine learning model 428, a third machine learning model 430, a first set of aligned features 422, and a second set of aligned features 424. The system 400 may be an exemplary implementation of one or more above-discussed aspects. For example, the system 400 may be contained within the vehicle 100, may be an exemplary implementation of the processing system in FIG. 2 (such as the ISP 212, the processor 204, or combinations thereof), and the like.

The computing device 402 may receive sensor data 410, 412, 414 from the sensors. In certain implementations, the sensor data may include position sensor data, image sensor data, IMU sensor data, or a combination thereof. For example, the sensor 404 may be an image sensor and the sensor data 410 may include image data, the sensor 406 may be a position sensor and the sensor data 412 may include position data, and the sensor 404 may be an IMU and the sensor data 414 may include IMU data.

The computing device 402 may be configured to determine, based on received sensor data 410, 412, 414, a first set of features 416 for an area surrounding a vehicle, such as the vehicle 100. In certain implementations, the first set of features 416 may be features used by a perception pipeline for the vehicle. For example, the perception pipeline may be configured to receive image sensor data from one or more image sensors located on the vehicle and position sensor data from one or more position sensors located on the vehicle and may determine locations of objects within the area surrounding the vehicle based on the sensor data.

In certain implementations, features for image data may include numerical representations of various aspects of an image frame. Some examples of features include color histograms, texture descriptors, edge detection, and shape analysis. Color histograms may quantify the distribution of colors in an image, while texture descriptors may capture patterns such as roughness or smoothness. Edge detections may identify boundaries between objects in an image, while shape analysis may identify or otherwise distinguish different types of objects based on geometric properties of the object within the image frame. In certain implementations, features for position data may include numerical representations of various aspects of a point cloud. Some examples of features include distance histograms, surface normals, curvature estimation, and segmentation. Distance histograms may quantify the distribution of distances between points in a point cloud, while surface normals may capture the orientation of local surfaces. Curvature estimation may measure the degree of bending or flatness of a surface, while segmentation may identify or otherwise distinguish different types of objects based on spatial proximity and similarity of the points within the point cloud. In certain implementations, the features may be stored in feature vectors. The feature vectors may be single-dimensional, such as an N×1 vector, where N may be the number of features. In additional or alternative implementations, feature vectors may be multi-dimensional, such as an N×M×O vector, where at least two of N, M, and O are greater than 1.

In certain implementations, the first set of features 416 include top view features for the area surrounding the vehicle. In certain implementations, the top view features may be features such as those described above that are projected or otherwise positioned into a top-down view of a vehicle. Top-down views may provide top-down (or bird's eye view) representations of vehicles and their surroundings. Top-down views may consist of a grid-based image or other representation (such as a 128-by-128 pixel representation) that depict objects or obstacles located within the vehicle's vicinity (such as within a predetermined range of the vehicle). Top-down views may also include metadata or other indications that identify particular types of objects or obstacles located within each pixel of the grid. In particular, the top-down features may specify locations within top-down views for the corresponding features (such as within a feature vector containing the feature). In certain implementations, the top-down features may individually specify corresponding locations for each feature and feature value. In additional or alternative implementations, the top-down view may include multiple feature vectors, where each feature vector corresponds to a particular location within the top-down representation.

In certain implementations, the top view features include a first set of top view features determined based on position sensor data and a second set of top view features determined based on image sensor data. In certain implementations, the top view features are formed by combining the first set of top view features with the second set of top view features (such as by concatenating the first and second sets of top view features at corresponding locations within a top-down view).

Figure 5:
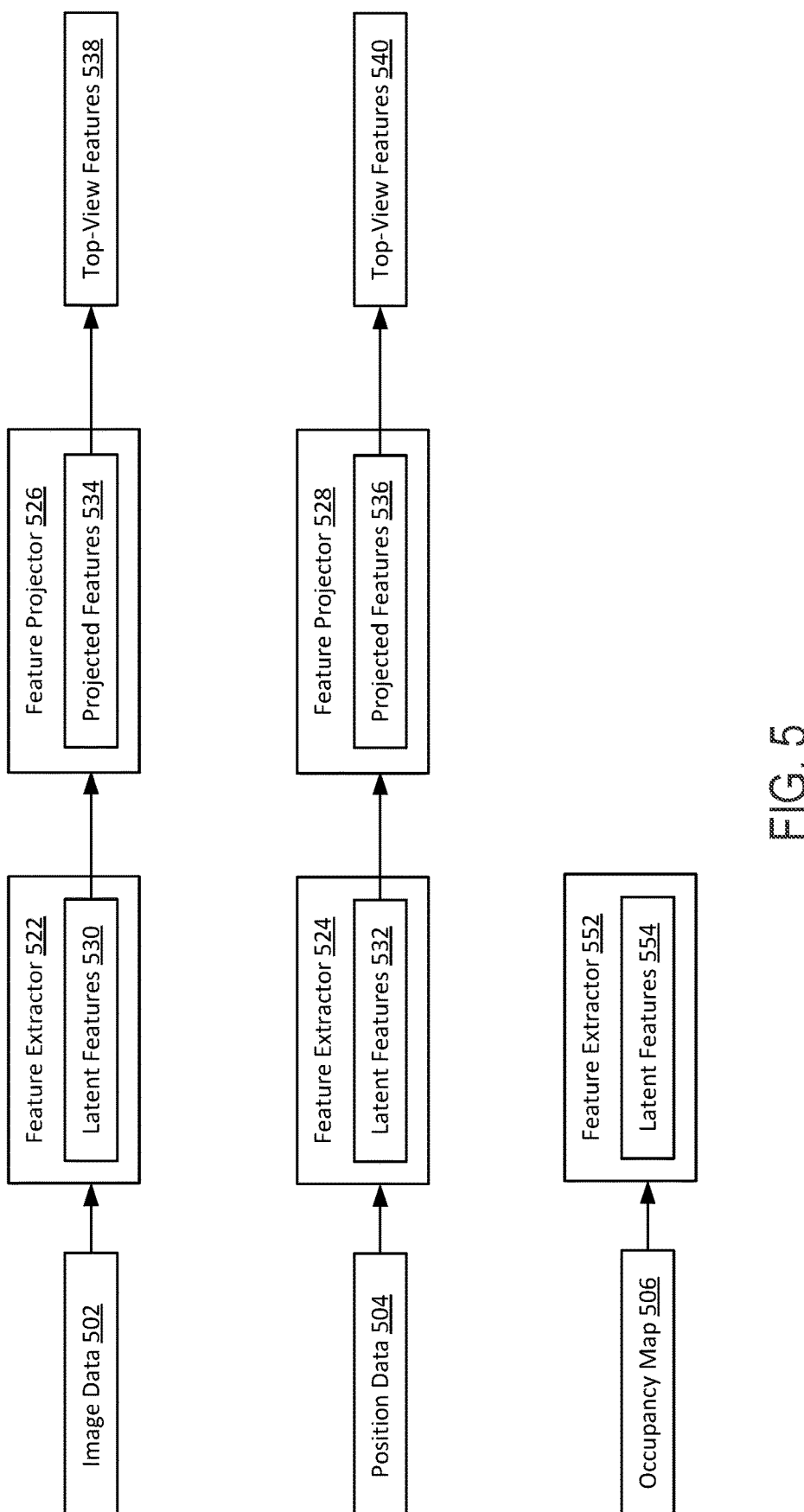
FIG. 5 is a block diagram of feature extraction processes according to one or more aspects of the disclosure.

In certain implementations, the first set of top view features are determined using at least one first machine learning model 426. In such implementations, the second set of top view features may be determined using at least one second machine learning model 428. For example, FIG. 5 depicts a feature extraction process 520 according to one aspect of the present disclosure. The top-down feature extraction process 520 may be configured to determine different types of features for different types of sensor data. For example, the top-down feature extraction process 520 may include separate pipelines for determining separate top-down features for image data 502 and position data 504. In particular, the top-down feature extraction process 520 includes a first feature extractor 522 for the image data 502 and a second feature extractor 524 for the position data 504. The feature extractors 522, 524 are configured to determine latent features 530, 532 for the image data 502 and the position data 504. The latent features 530, 532 may be features identified within the image data 502 and the position data 504, such as the example features identified above. The latent features 530, 532 may be identified from the perspective of corresponding sensors. For example, latent features 530 for image data 412 may be identified as locations within the images themselves, or as locations relative to a viewing perspective of the corresponding image sensors. Similarly, the latent features 532 may be identified as three-dimensional locations surrounding the vehicles from the perspective of one or more corresponding position sensors. In certain implementations, the latent features 530, 532 may be identified separately for each sensor within a sensor arrangement. For example, a separate set of latent features 530 (such as a separate feature vector) may be determined for each image frame within the image data 502. As another example, a separate set of latent features 532 may be determined for each frame of position data received from each position sensor within the position data 504.

The top-down feature extraction process 520 also includes feature projectors 526, 528. The feature projectors 526, 528 may receive the latent features 530, 532 and may determine projected features 534, 536 based on the latent features 530, 532. In particular, the feature projector 526, 528 may transform or otherwise project the locations of features within the latent features 530, 532 into corresponding locations within a top-view representation of the area surrounding the vehicle. As noted previously, top-view representations may be two-dimensional, and the feature projectors 526, 528 may accordingly be configured to project three-dimensional locations of the latent features 530, 532 into corresponding two-dimensional locations within the top-view representation. In implementations where the latent features 530, 532 include multiple feature vectors from multiple locations, the feature projectors 526, 528 may be configured to combine features from multiple feature vectors (such as multiple feature vectors corresponding to the same time interval) into a single set of projected features 534, 536.

Top-view features 538, 540 may be determined based on the projected features 534, 536. For example, the top-view features 538, 540 may be determined to include the values and locations from the projected features 534, 546. In certain implementations, the top-down feature extraction process 520 determines separate sets of top-view features 538 for the image data 502 and top-view features 540 for the position data 504.

In the top-down feature extraction process 520, separate pipelines are used to determine top-down features 538, 540 for image data 412 and position data 414. In still further implementations, different pipelines may be used to extract features from the same type of data, such as data captured from different models of sensors, sensors located in different parts of a vehicle, and the like. Furthermore, although the top-down feature extraction process 520 is only depicted as determining top-view features 538, 540 for the image data

502 and the position data 504, it should be understood that the top-down feature extraction process 520 may similarly be used to extract top-down features for other types of data, including other image data, other position data, or combinations thereof. Furthermore, certain implementations may utilize separate top-down feature extraction processes 522 for each of multiple sensor arrangements on a vehicle.

Stated differently, in a position sensor processing pipeline, an initial step may include extracting three-dimensional (3D) features by passing sensor data through a voxel encoder, which may voxelize the features. The voxel encoder may be a specialized form of neural network designed to transform 3D data into a latent representation by dividing it into a grid of voxels. Each voxel may then be processed through the neural network to produce the latent representation. Consequently, the features identified within the position data may be flattened or otherwise projected to generate the top-view features. In an image sensor pipeline, images are encoded and transferred, or "lifted," into 3D space. The resulting 3D feature vectors from this process are then projected to top-view features. As a final step in data preparation, BEV features derived from both the LiDAR and camera pipelines may concatenated to create unified BEV features (such as the first set of features 416).

Returning to FIG. 4, the computing device 402 may be configured to determine, based on an occupancy map for the area surrounding the vehicle, a second set of features 418 for the area surrounding the vehicle. In certain implementations, the second set of features 418 may be features used by a navigation pipeline for the vehicle. In certain implementations, the occupancy map may be a previous occupancy map for the area surrounding the vehicle. For example, and as explained further below, top-view features for previous sensor data (such as a previously-aligned set of top-view perception features) may be used to determine an occupancy map, which may be subsequently used to determine navigation features. For example, the computing device 402 may be configured to determine, based on at least a portion of the third set of features 420, an occupancy map based on locations of objects within an area surrounding the vehicle. The occupancy map may then be subsequently used by a navigation pipeline to determine the second set of features 418. In such instances, the second set of features 418 include spatial features determined based on the previous occupancy map.

In certain implementations, the second set of features 418 are determined by a machine learning model (such as a convolution model) based on the previous occupancy map. For example, FIG. 5 also includes an occupancy map 506 and a feature extractor 552 configured to extract latent features 554 from the occupancy map 506. In certain implementations, latent features for occupancy maps may include numerical representations of various aspects of a 3D bounding box. For example, the latent features 554 may include spatial features, object density, object distribution, and intersection over union (IoU). Spatial features may capture the position and dimensionality of objects within the 3D bounding box, providing essential data on the relative location and size of each object in the space. Object density may quantify the number of objects within a specific volume, giving an idea of how crowded or sparse a given region is. Object distribution may represent how evenly or unevenly objects are spread throughout the 3D space, providing insight into patterns or clusters that may exist. Intersection over union (IoU) representations may indicate how much one object overlaps with another in the 3D space, which may be used to identify collisions or close proximity between multiple objects. Furthermore, occupancy maps can also provide features such as height histograms and occupancy grid.

The feature extractor 552 may be a machine learning model trained to extract the latent features 554. For example, the feature extractor 552 may be a convolutional model (such as a convolutional neural network) that is trained to extract latent features from occupancy maps 506. In particular implementations, the latent features 554 may include spatial features extracted from the occupancy map 506, such as one or more of the spatial features described above.

In certain implementations, the features may be stored in feature vectors. The feature vectors may be single-dimensional, such as an N×1 vector, where N may be the number of features. In additional or alternative implementations, feature vectors may be multi-dimensional, such as an N×M×O vector, where at least two of N, M, and O are greater than 1. In additional or alternative implementations, the latent features 554 may be determined as top view features for the area surrounding the vehicle, such as within a top-view representation of an area surrounding the vehicle, as described above.

Stated differently, an occupancy map or grid of a given scene is initially processed through a convolution layer, which may be known as a navigation encoder. The convolution layer may extract essential spatial features from the occupancy map. Following this extraction, the spatial features may be flattened (such as to a top view) for further processing.

Returning to FIG. 4, the computing device 402 may be configured to determine a third set of features 420 that align the first set of features 416 with the second set of features 418. In certain implementations, the third set of features 420 align each of at least a subset of the second set of features 418 with at least one corresponding feature from the first set of features 416. In certain implementations, aligning the first set of features 416 with the second set of features 418 may be determined according to one or more criteria. For example, features that are located spatially near one another within the top view representation may be aligned with one another. Additionally or alternatively similar types of features or related features may be aligned with one another.

In certain implementations, aligning the first set of features 416 with the second set of features 418 ranks the first set of features 416 based on relevance to the second set of features 418. In certain implementations, for example, particular features within the second set of features 418 may be more important for navigation purposes, which may be indicated (such as with metadata) within the second set of features 418. In such instances, features in the first set of features 416 that are aligned with important features from the second set of features 418 may be ranked higher. Additionally or alternatively, the first set of features may be ranked higher when aligned with more than one feature from the second set of features 418. In various implementations, rankings for the features 416, 418 may be determined as a weighted combination of various criteria, including importance of aligned features, numbers of aligned features, and the like. Stated differently, contextual grounding of the first set of features 416 with the second set of features 418 may be achieved by alignment between the intermediate features of a navigation pipeline and a perception pipeline, such that features identified by the perception pipeline are ranked higher for objects that are relevant to the navigation pipeline, when compared to features for other objects.

In certain implementations, the third set of features 420 are determined based on a first attention map for the first set of features 416 and a second attention map for the second set of features 418. In certain implementations, the first attention map and the second attention map are determined using a query, key, value process. Additionally or alternatively, the third set of features 420 may include a first set of aligned features 422 and a second set of aligned features 424.

Figure 6:
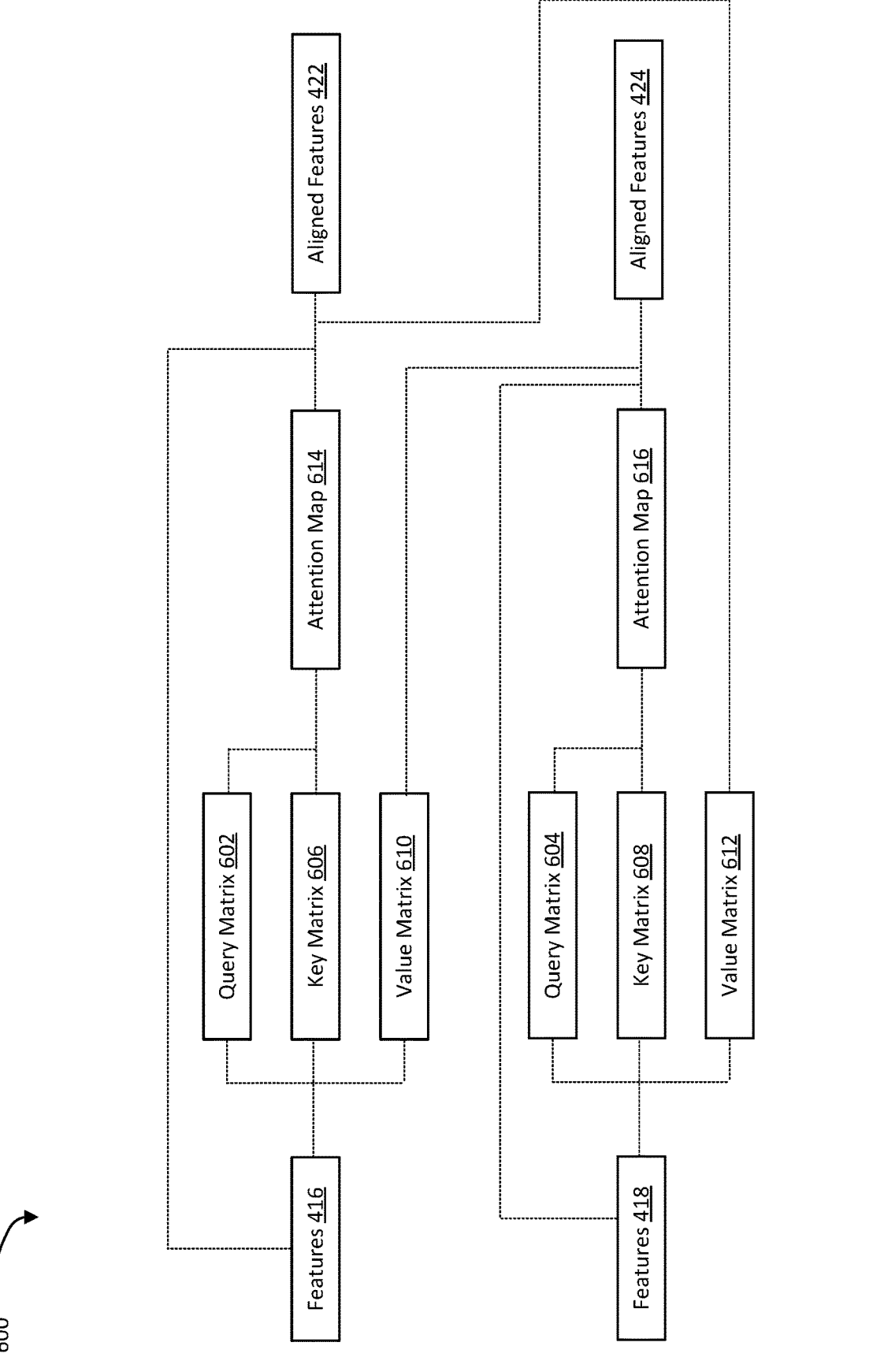
FIG. 6 is a block diagram of a feature alignment process according to one or more aspects of the disclosure.

For example, FIG. 6 depicts a feature alignment process 600 according to one aspect of the present disclosure. The process 600 includes the first set of features 416, the second set of features 418, the first set of aligned features 422, and the second set of aligned features 424. In particular, the process 600 may be performed (such as by the computing device 402) to determine the first set of aligned features 422 and the second set of aligned features 424 based on the first set of features 416 and the second set of features. To do so, the process 600 also includes a first query matrix 602, a first key matrix 606, a first value matrix 610, a second query matrix 604, a second key matrix 608, a second value matrix 612, a first attention map 614, and a second attention map 616.

In the process 600, the computing device 402 may be configured to determine, based on (i) the first set of features 416 and (ii) a first dimensionality of the first set of features 416, a first query matrix 602, a first key matrix 606, and a first value matrix 610. The dimensionality of feature vectors, such as the first set of features 416 and the second set of features 418, may refer to the number of features or variables each vector contains. For example, a two-dimensional feature vector may be implemented as an N×M array, and the values of N and M may constitute the dimensionality of the feature vector. Other types of dimensionality may be used, such as for 1-dimensional feature vectors, three-dimensional feature vectors, and the like. The computing device may also be configured to determine the attention map 614 based on the first query matrix 602 and the first key matrix 606. The computing device 402 may also determine, based on (i) the second set of features 418 and (ii) a second dimensionality of the second set of features 418, a second query matrix 604, a second key matrix 608, and a second value matrix 612. The computing device 402 may also determine the second attention map 616 based on the second query matrix 604 and the second key matrix 608.

In one particular implementation, the matrices 602, 604, 606, 608, 610, 612 may be determined as:

$$Q_1 = X_1 W_{q1},$$

$$K_1 = X_1 W_{k1},$$

$$V_1 = X_1 W_{v1},$$

$$Q_2 = X_2 W_{q2},$$

$$K_2 = X_2 W_{k2},$$

$$V_2 = X_2 W_{v2},$$

where:
  $Q_1$ is the first query matrix 602,
  $Q_2$ is the second query matrix 604,
  $K_1$ is the first key matrix 606,
  $K_2$ is the second key matrix 608,
  $V_1$ is the first value matrix 610,
  $V_2$ is the second value matrix 612,
  $X_1$ is the first set of features 416,
  $X_2$ is the second set of features 418,
  $W_{qi}$ are weights assigned to features when determining the query matrices 602, 604 (e.g., for i=1, 2),
  $W_{ki}$ are weights assigned to features when determining the key matrices 606, 608 (e.g., for i=1, 2), $W_{vi}$ are weights assigned to features when determining the value matrices 610, 612 (e.g., for i=1, 2).

In certain such implementations, the weights $W_{qi}$, $W_{ki}$, $W_{vi}$ may be determined by a model (such as the model 430).

The attention maps 614 may be determined as:

$$A_1 = \text{softmax}\left(\frac{Q_1 K_2^T}{\sqrt{d_k}}\right)$$

$$A_2 = \text{softmax}\left(\frac{Q_2 K_1^T}{\sqrt{d_k}}\right)$$

where:

$A_1$ is the first attention map 614, $A_2$ is the second attention map 616, and $d_k$ is the dimensionality of the corresponding key matrix 606, 608.

The computing device 402 may determine the third set of features 420 based on the first attention map 614 and the second attention map 616. In certain implementations, a first set of aligned features 422 may be determined based on the first set of features 416, the first attention map 614, and the second value matrix 612. In additional or alternative implementations, a second set of aligned features 424 may be determined based on the second set of features 418, the second attention map 616, and the first value matrix 610. In certain implementations, the third set of features may be determined as a combination of the first set of aligned features 422 and the second set of aligned features 424. For example, the first set of aligned features 422 and the second set of aligned features 424 may be concatenated (such as at corresponding locations within a top-down representation of the area surrounding the vehicle).

In one particular implementation, the aligned features 422, 424 may be determined as:

$$X_1' = (A_1 V_2)W_{O^1} + X_1$$

$$X_2' = (A_2 V_1)W_{O^2} + X_2$$

where:

$X_1'$ is the first set of aligned features 422, $X_2'$ is the second set of aligned features 424, and $W_{O^i}$ is the weight matrix applied when determining the i-th set of aligned features 422, 424.

Stated differently, a transformer model, such as a BERT transformer, a ViLBERT transformer, and the like, may analyze the first set of features 416 and the second set of features 418 to accurately understand the context of each feature. An element-wise product of the intermediate features from both navigation and perception pipelines may accordingly be determined, followed by a linear layer configured to predict if both sets of features are aligned accurately. In one specific implementation, to extract multi-modal alignment features from the perception and navigation pipeline, a co-attentional transformer layer may be employed. This layer may compute query, key, and value matrices as in a standard transformer block, with keys and values from each modality passed as input to the other modality's multi-headed attention block. Given that intermediate features from both perception and navigation pipelines represent a top view of a scene, these intermediate features are encoded by the transformer layer as spatial location, which may include constructing a 5-d vector from portions of the scene covered by the data. Features encoded in this way may then be projected to match the dimension of the first and second sets of features 416, 418 visual feature before being added together.

The co-attentional transformer layer may include a transformer-based neural network architecture that is calibrated to ensure alignment of spatial intermediate features derived from both perception and navigation pipelines. This alignment process may utilize a query, key, value mechanism of transformer models and may compute attention maps that represent the similarity between the intermediate features. The attention maps subsequently serve to weight the intermediate features across both pipelines, thereby aligning the features. To further enhance this alignment process, a cross-entropy loss measure may be applied to ensure that corresponding spatial features of both perception and navigation pipelines are harmonized, such as by making their latent feature spaces similar (such as with similar features located in similar positions).

One or more of the operations discussed above in connection with FIGS. 5 and 6 may be implemented by one or more machine learning models, such as the models 426, 428, 430. For example, in one implementation, the first set of features 416 may be determined by the model 426, which may include one or more of the feature extractors 522, 524, the feature projectors 526, 528, or combinations thereof. As another example, the second set of features 418 may be determined by the second model 428, which may include the feature extractor 552. As a further example, the third set of features 420 may be determined by the third model 430, which may be configured to perform all or part of the process 600. In particular, the third model 430 may include a transformer model configured to perform the process 600. In certain instances, the third model 430 may be identified or otherwise referred to as a co-attentional transformer model by those skilled in the art.

The computing device 402 may be configured to determine vehicle control instructions based on the third set of features 420. For example, the computing device 402 may determine vehicle control instructions based on one or both of the first set of aligned features 422 and the second set of aligned features 424. In particular implementations, the computing device 402 may determine vehicle control instructions based on the second set of aligned features 424. For example, the second set of aligned features 424 may be further processed by the navigation pipeline to determine vehicle control instructions. In particular, the second set of aligned features 424 may be concatenated with features extracted from data received from a global planner (such as a global route planning process), an IMU (such as IMU sensor data), and the like. The combined navigation features may then be processed by one or more machine learning models to determine the vehicle control instructions. For example, the combined navigation features may be processed using a fully-connected layer to determine a final set of features for the navigation pipeline, which may be used to determine the vehicle control instructions.

In certain implementations, the computing device 402 may be configured to determine an occupancy map for the area surrounding the vehicle based on the third set of features 420. For example, the computing device 402 may determine an occupancy map based on one or more of the first set of aligned features 422 and the second set of aligned features 424. In one particular implementation, the computing device 402 may be configured to determine an occupancy map based on the first set of aligned features 422. In certain implementations, the occupancy map may be used for future processing by the navigation pipeline. In particular implementations, the first set of aligned features may be processed using a machine learning model (such as a trans-fusion decoder model) to determine bounding boxes for objects within the area surrounding the vehicle (such as 3D bounding boxes). Occupancy maps may then be determined based on the bounding boxes.

The computing device 402 may be configured to train one or more of the models 426, 428, 430. For example, the models 426, 428, 430 may be implemented as one or more machine learning models, including supervised learning models, unsupervised learning models, other types of machine learning models, and/or other types of predictive models. For example, the models 426, 428, 430 may be implemented as one or more of neural networks, transformer models, decision tree models, support vector machines, Bayesian networks, classifier models, regression models, or combinations thereof.

In certain implementations, one or more of the models 426, 428, 430 may be trained prior to determining the first set of features 416 and the second set of features 418. In additional or alternative implementations, one or more of the models 426, 428, 430 may be trained after determining the third set of features (such as to update one or more of the models 426, 428, 430). In certain implementations, one or both of the first model 426 and the second model 428 may be trained prior to training the third model 430. For example, training the models 426, 428, 430 may include training at least one first model 426 to determine the first set of features 416 and training at least one second model 428 to determine the second set of features 418. The third model 430 may then be trained based on the first model 426 and the second model 428. For example, the third model 430 may be trained using first sets of features from the first model 426 and second sets of features from the second model 428.

In certain implementations, the models 426, 428, 430 may be trained based on training data to perform as described above. For example, one or more training datasets may be used that specify one or more expected outputs for corresponding inputs. Parameters of the models 426, 428, 430 may be updated based on whether the models 426, 428, 430 generate correct outputs when compared to corresponding expected outputs. In particular, the models 426, 428, 430 may receive one or more pieces of input data from the training data sets that are associated with a plurality of expected outputs. The models 426, 428, 430 may generate predicted outputs based on a current configuration of the models 426, 428, 430. The predicted outputs may be compared to the expected outputs and one or more parameter updates may be computed based on differences between the predicted outputs and the expected outputs. In particular, the parameters may include weights (e.g., priorities) for different features and combinations of features. The parameter updates the models 426, 428, 430 may include updating one or more of the features analyzed and/or the weights assigned to different features or combinations of features (e.g., relative to the current configuration of the models 426, 428, 430).

Figure 7:
FIG. 7 is a flow chart illustrating an example method for feature extraction and alignment according to one or more aspects of the disclosure.

One method of performing image processing according to embodiments described above is shown in FIG. 7. FIG. 7 is a flow chart illustrating an example method 700 for feature extraction and alignment.

The method 700 includes determining, based on received sensor data, a first set of features for an area surrounding a vehicle (block 702). For example, the computing device 402 may determine, based on received sensor data 410, 412, 414, a first set of features 416 for an area surrounding a vehicle, such as the vehicle 100. In certain implementations, the first set of features 416 may be features used by a perception pipeline for the vehicle. In certain implementations, the first set of features 416 include top view features for the area surrounding the vehicle. In certain implementations, the top view features include a first set of top view features determined based on position sensor data and a second set of top view features determined based on image sensor data.

The method 700 includes determining, based on an occupancy map for the area surrounding the vehicle, a second set of features 418 for the area surrounding the vehicle (block 704). For example, the computing device 402 may determine, based on an occupancy map for the area surrounding the vehicle, a second set of features 418 for the area surrounding the vehicle. In certain implementations, the second set of features 418 may be features used by a navigation pipeline for the vehicle. In certain implementations, the occupancy map may be a previous occupancy map for the area surrounding the vehicle. In such instances, the second set of features 418 include spatial features determined based on the previous occupancy map. In certain implementations, the second set of features 418 are determined by a machine learning model 428 based on the previous occupancy map.

The method 700 includes determining a third set of features 420 that align the first set of features 416 with the second set of features 418 (block 706). For example, the computing device 402 may determine a third set of features 420 that align the first set of features 416 with the second set of features 418. In certain implementations, the third set of features 420 align each of at least a subset of the second set of features 418 with at least one corresponding feature from the first set of features 416. In certain implementations, aligning the first set of features 416 with the second set of features 418 ranks the first set of features 416 based on relevance to the second set of features 418. In certain implementations, the third set of features 420 are determined based on a first attention map 614 for the first set of features 416 and a second attention map 616 for the second set of features 418. In certain implementations, the first attention map 614 and the second attention map 616 are determined using a query, key, value process, such as the process 600. For example, determining the third set of features 420 may include determining, based on (i) the first set of features 416 and (ii) a first dimensionality of the first set of features 416, a first query matrix 602, a first key matrix 606, and a first value matrix 610 and determining, based on the first query matrix 602 and the first key matrix 606, the first attention map 614. Determining the third set of features 420 may also include determining, based on (i) the second set of features 418 and (ii) a second dimensionality of the second set of features 418, a second query matrix 604, a second key matrix 608, and a second value matrix 612 and determining, based on the second query matrix 604 and the second key matrix 608, the second attention map 616. The third set of features 420 may then be determined based on the first attention map 614 and the second attention map 616. In certain implementations, the third set of features 420 may include a first set of aligned features 422 and a second set of aligned features 424. In such instances, determining the third set of features 420 may further include determining the first set of aligned features 422 based on the first attention map 614, the second value matrix 612, and the first set of features 416 and determining the second set of aligned features 424 based on the second attention map 616, the first value matrix 610, and the second set of features 418.

The method 700 may further include determining vehicle control instructions based on the third set of features 420. For example, determining the vehicle control instructions may include determining vehicle control instructions based on the second set of aligned features 424.

The method 700 may further include determining an occupancy map for the area surrounding the vehicle. For example, determining the occupancy map may include determining an occupancy map for the area surrounding the vehicle based on the first set of aligned features 422.

The method 700 may further include training one or more of the models 426, 428, 430. For example, one or more of the models 426, 428, 430 may be trained before block 702, after block 706, or a combination thereof. In such implementations, the method 700 may include training at least one first machine learning model 426 to determine the first set of features 416 and training at least one second machine learning model 428 to determine the second set of features 418. The method 700 may further include training, using the at least one first machine learning model 426 and the at least one second machine learning model 428, at least one third machine learning model 430 to determine the third set of features 420.

It is noted that one or more blocks (or operations) described with reference to FIG. 7 may be combined with one or more blocks (or operations) described with reference to another of the figures. For example, one or more blocks (or operations) of FIG. 7 may be combined with one or more blocks (or operations) of FIG. 1-3. As another example, one or more blocks associated with FIG. 7 may be combined with one or more blocks associated with FIG. 4. As a further example, one or more blocks associated with FIG. 7 may be combined with one or more blocks associated with FIGS. 5-6.

In one or more aspects, techniques for supporting vehicular operations may include additional aspects, such as any single aspect or any combination of aspects described below or in connection with one or more other processes or devices described elsewhere herein. A first aspect provides a method that includes determining, based on received sensor data, a first set of features for an area surrounding a vehicle. The method also includes determining, based on an occupancy map for the area surrounding the vehicle, a second set of features for the area surrounding the vehicle. The method also includes determining a third set of features that align the first set of features with the second set of features, where the third set of features align each of at least a subset of the second set of features with at least one corresponding feature from the first set of features.

In a second aspect, in combination with the first aspect, the method further includes determining, using a query, key, value process, a first attention map for the first set of features and a second attention map for the second set of features; and determining the third set of features based on the first attention map and the second attention map.

In a third aspect, in combination with the second aspect, determining the third set of features may include determining, based on (i) the first set of features and (ii) a first dimensionality of the first set of features, a first query matrix, a first key matrix, and a first value matrix; determining, based on the first query matrix and the first key matrix, the first attention map; determining, based on (i) the second set of features and (ii) a second dimensionality of the second set of features, a second query matrix, a second key matrix, and a second value matrix; and determining, based on the second query matrix and the second key matrix, the second attention map.

In a fourth aspect, in combination with the third aspect, the third set of features includes a first set of aligned features and a second set of aligned features, and determining the third set of features may include determining the first set of aligned features based on the first attention map, the second value matrix, and the first set of features; and determining the second set of aligned features based on the second attention map, the first value matrix, and the second set of features.

In a fifth aspect, in combination with the fourth aspect, the method further includes determining vehicle control instructions based on the second set of aligned features.

In a sixth aspect, in combination with one or more of the fourth aspect through the fifth aspect, the method may further include determining an occupancy map for the area surrounding the vehicle based on the first set of aligned features.

In a seventh aspect, in combination with one or more of the first aspect through the sixth aspect, the first set of features includes a first set of top view features determined based on position sensor data and a second set of top view features determined based on image sensor data.

In an eighth aspect, in combination with one or more of the first aspect through the seventh aspect, the occupancy map is a previous occupancy map for the area surrounding the vehicle, and where the second set of features include spatial features determined based on the previous occupancy map.

In a ninth aspect, in combination with one or more of the first aspect through the eighth aspect, aligning the first set of features with the second set of features ranks the first set of features based on relevance to the second set of features.

In a tenth aspect, in combination with one or more of the first aspect through the ninth aspect, the method may further include training at least one first machine learning model to determine the first set of features; training at least one second machine learning model to determine the second set of features; and training, using the at least one first machine learning model and the at least one second machine learning model, at least one third machine learning model to determine the third set of features.

An eleventh aspect provides an apparatus that includes a memory storing processor-readable code and at least one processor coupled to the memory. The at least one processor may be configured to execute the processor-readable code to cause the at least one processor to perform operations that include determining, based on received sensor data, a first set of features for an area surrounding a vehicle; determining, based on an occupancy map for the area surrounding the vehicle, a second set of features for the area surrounding the vehicle; and determining a third set of features that align the first set of features with the second set of features, where the third set of features align each of at least a subset of the second set of features with at least one corresponding feature from the first set of features.

In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a twelfth aspect, in combination with the eleventh aspect, the operations may further include determining, using a query, key, value process, a first attention map for the first set of features and a second attention map for the second set of features; and determining the third set of features based on the first attention map and the second attention map.

In a thirteenth aspect, in combination with the twelfth aspect, determining the third set of features may include determining, based on (i) the first set of features and (ii) a first dimensionality of the first set of features, a first query matrix, a first key matrix, and a first value matrix; determining, based on the first query matrix and the first key matrix, the first attention map; determining, based on (i) the second set of features and (ii) a second dimensionality of the second set of features, a second query matrix, a second key matrix, and a second value matrix; and determining, based on the second query matrix and the second key matrix, the second attention map.

In a fourteenth aspect, in combination with the thirteenth aspect, the set of features includes a first set of aligned features and a second set of aligned features, and determining the third set of features may include determining the first set of aligned features based on the first attention map, the second value matrix, and the first set of features; and determining the second set of aligned features based on the second attention map, the first value matrix, and the second set of features.

In a fifteenth aspect, in combination with the fourteenth aspect, the operations may further include determining vehicle control instructions based on the second set of aligned features.

In a sixteenth aspect, in combination with one or more of the fourteenth aspect through the fifteenth aspect, the operations may further include determining an occupancy map for the area surrounding the vehicle based on the first set of aligned features.

In a seventeenth aspect, in combination with one or more of the eleventh aspect through the sixteenth aspect, the first set of features includes a first set of top view features determined based on position sensor data and a second set of top view features determined based on image sensor data.

In an eighteenth aspect, in combination with one or more of the eleventh aspect through the seventeenth aspect, the occupancy map is a previous occupancy map for the area surrounding the vehicle, and the second set of features include spatial features determined based on the previous occupancy map.

In a nineteenth aspect, in combination with one or more of the eleventh aspect through the eighteenth aspect, aligning the first set of features with the second set of features ranks the first set of features based on relevance to the second set of features.

In a twentieth aspect, in combination with one or more of the eleventh aspect through the nineteenth aspect, the operations may further include training at least one first machine learning model to determine the first set of features; training at least one second machine learning model to determine the second set of features; and training, using the at least one first machine learning model and the at least one second machine learning model, at least one third machine learning model to determine the third set of features.

A twenty-first aspect provides a vehicle that includes at least one sensor configured to capture sensor data, a memory storing processor-readable code, and at least one processor coupled to the memory and the at least one sensor. The at least one processor may be configured to execute the processor-readable code to cause the at least one processor to perform operations including determining, based on sensor data from the at least one sensor, a first set of features for an area surrounding the vehicle. The operations also include determining, based on an occupancy map for the area surrounding the vehicle, a second set of features for the area surrounding the vehicle. The operations also include determining a third set of features that align the first set of features with the second set of features, where the third set of features align each of at least a subset of the second set of features with at least one corresponding feature from the first set of features.

In a twenty-second aspect, in combination with the twenty-first aspect, the operations further may include determining, using a query, key, value process, a first attention map for the first set of features and a second attention map for the second set of features; and determining the third set of features based on the first attention map and the second attention map.

In a twenty-third aspect, in combination with the twenty-second aspect, determining the third set of features may include determining, based on (i) the first set of features and (ii) a first dimensionality of the first set of features, a first query matrix, a first key matrix, and a first value matrix; determining, based on the first query matrix and the first key matrix, the first attention map; determining, based on (i) the second set of features and (ii) a second dimensionality of the second set of features, a second query matrix, a second key matrix, and a second value matrix; and determining, based on the second query matrix and the second key matrix, the second attention map.

In a twenty-fourth aspect, in combination with the twenty-third aspect, the third set of features includes a first set of aligned features and a second set of aligned features, and determining the third set of feature may further include determining the first set of aligned features based on the first attention map, the second value matrix, and the first set of features; and determining the second set of aligned features based on the second attention map, the first value matrix, and the second set of features.

In a twenty-fifth aspect, in combination with one or more of the twenty-first aspect through the twenty-fourth aspect, the operations may further include training at least one first machine learning model to determine the first set of features; training at least one second machine learning model to determine the second set of features; and training, using the at least one first machine learning model and the at least one second machine learning model, at least one third machine learning model to determine the third set of features.

A twenty-sixth aspect provides a non-transitory computer-readable medium storing instructions that, when executed by a processor, cause the processor to perform operations that include determining, based on received sensor data, a first set of features for an area surrounding a vehicle. The operations also include determining, based on an occupancy map for the area surrounding the vehicle, a second set of features for the area surrounding the vehicle. The operations also include determining a third set of features that align the first set of features with the second set of features, where the third set of features align each of at least a subset of the second set of features with at least one corresponding feature from the first set of features.

In a twenty-seventh aspect, in combination with the twenty-sixth aspect, the operations further may include determining, using a query, key, value process, a first attention map for the first set of features and a second attention map for the second set of features; and determining the third set of features based on the first attention map and the second attention map.

In a twenty-eighth aspect, in combination with the twenty-seventh aspect, determining the third set of features may include determining, based on (i) the first set of features and (ii) a first dimensionality of the first set of features, a first query matrix, a first key matrix, and a first value matrix; determining, based on the first query matrix and the first key matrix, the first attention map; determining, based on (i) the second set of features and (ii) a second dimensionality of the second set of features, a second query matrix, a second key matrix, and a second value matrix; and determining, based on the second query matrix and the second key matrix, the second attention map.

In a twenty-ninth aspect, in combination with the twenty-eighth aspect, the third set of features includes a first set of aligned features and a second set of aligned features, and determining the third set of features may further include determining the first set of aligned features based on the first attention map, the second value matrix, and the first set of features; and determining the second set of aligned features based on the second attention map, the first value matrix, and the second set of features.

In a thirtieth aspect, in combination with one or more of the twenty-sixth aspect through the twenty-ninth aspect, the operations may further include training at least one first machine learning model to determine the first set of features; training at least one second machine learning model to determine the second set of features; and training, using the at least one first machine learning model and the at least one second machine learning model, at least one third machine learning model to determine the third set of features.

Components, the functional blocks, and the modules described herein with respect to FIGS. 1-4 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method comprising:
determining, based on received sensor data, a first set of features for an area surrounding a vehicle;

determining, based on an occupancy map for the area surrounding the vehicle, a second set of features for the area surrounding the vehicle, wherein a first subset of the second set of features are each associated with an indication of navigational importance;

determining, using a query, key, value process, a first attention map for the first set of features and a second attention map for the second set of features, wherein the first attention map is determined based on a first query matrix and a first key matrix, and the second attention map is determined based on a second query matrix and a second key matrix; and determining, based on the first attention map and the second attention map, a third set of features that align the first set of features with the second set of features, wherein the third set of features align each of at least a second subset of the second set of features with at least one corresponding feature from the first set of features according to a ranking of the first set of features, wherein the ranking is based on whether a feature of the first set of features corresponds to a feature of the at least a second subset that is associated with the indication of navigational importance.

2. The method of claim 1, wherein the third set of features includes a first set of aligned features and a second set of aligned features, and wherein determining the third set of features further comprises:

determining the first set of aligned features based on the first attention map, the second value matrix, and the first set of features; and determining the second set of aligned features based on the second attention map, the first value matrix, and the second set of features.

3. The method of claim 2, further comprising:
determining vehicle control instructions based on the second set of aligned features.

4. The method of claim 2, further comprising:
determining an occupancy map for the area surrounding the vehicle based on the first set of aligned features.

5. The method of claim 1, wherein the first set of features includes a first set of top view features determined based on position sensor data and a second set of top view features determined based on image sensor data.

6. The method of claim 1, wherein the occupancy map is a previous occupancy map for the area surrounding the vehicle, and wherein the second set of features include spatial features determined based on the previous occupancy map.

7. The method of claim 1, wherein the ranking is based on relevance of the first set of features to the second set of features.

8. The method of claim 1, further comprising:
training at least one first machine learning model to determine the first set of features;

training at least one second machine learning model to determine the second set of features; and training, using the at least one first machine learning model and the at least one second machine learning model, at least one third machine learning model to determine the third set of features.

9. An apparatus, comprising:
a memory storing processor-readable code; and at least one processor coupled to the memory, the at least one processor configured to execute the processor-readable code to cause the at least one processor to perform operations including:

determining, based on received sensor data, a first set of features for an area surrounding a vehicle;

determining, based on an occupancy map for the area surrounding the vehicle, a second set of features for the area surrounding the vehicle, wherein a first subset of the second set of features are each associated with an indication of navigational importance;

determining, using a query, key, value process, a first attention map for the first set of features and a second attention map for the second set of features, wherein the first attention map is determined based on a first query matrix and a first key matrix, and the second attention map is determined based on a second query matrix and a second key matrix; and determining, based on the first attention map and the second attention map, a third set of features that align the first set of features with the second set of features, wherein the third set of features align each of at least a second subset of the second set of features with at least one corresponding feature from the first set of features according to a ranking of the first set of features, wherein the ranking is based on whether a feature of the first set of features corresponds to a feature of the at least a second subset that is associated with the indication of navigational importance.

10. The apparatus of claim 9, wherein the third set of features includes a first set of aligned features and a second set of aligned features, and wherein determining the third set of features further comprises:

determining the first set of aligned features based on the first attention map, the second value matrix, and the first set of features; and determining the second set of aligned features based on the second attention map, the first value matrix, and the second set of features.

11. The apparatus of claim 10, wherein the operations further comprise:

determining vehicle control instructions based on the second set of aligned features.

12. The apparatus of claim 10, wherein the operations further comprise:

determining an occupancy map for the area surrounding the vehicle based on the first set of aligned features.

13. The apparatus of claim 9, wherein the first set of features includes a first set of top view features determined based on position sensor data and a second set of top view features determined based on image sensor data.

14. The apparatus of claim 9, wherein the occupancy map is a previous occupancy map for the area surrounding the vehicle, and wherein the second set of features include spatial features determined based on the previous occupancy map.

15. The apparatus of claim 9, wherein the ranking is based on relevance of the first set of features to the second set of features.

16. The apparatus of claim 9, wherein the operations further comprise:

training at least one first machine learning model to determine the first set of features;

training at least one second machine learning model to determine the second set of features; and training, using the at least one first machine learning model and the at least one second machine learning model, at least one third machine learning model to determine the third set of features.

17. A vehicle, comprising:

at least one sensor configured to capture sensor data;

a memory storing processor-readable code; and at least one processor coupled to the memory and the at least one sensor, the at least one processor configured to execute the processor-readable code to cause the at least one processor to perform operations including:

determining, based on sensor data from the at least one sensor, a first set of features for an area surrounding the vehicle;

determining, based on an occupancy map for the area surrounding the vehicle, a second set of features for the area surrounding the vehicle, wherein a first subset of the second set of features are each associated with an indication of navigational importance;

determining, using a query, key, value process, a first attention map for the first set of features and a second attention map for the second set of features, wherein the first attention map is determined based on a first query matrix and a first key matrix, and the second attention map is determined based on a second query matrix and a second key matrix; and determining, based on the first attention map and the second attention map, a third set of features that align the first set of features with the second set of features, wherein the third set of features align each of at least a second subset of the second set of features with at least one corresponding feature from the first set of features according to a ranking of the first set of features, wherein the ranking is based on whether a feature of the first set of features corresponds to a feature of the at least a second subset that is associated with the indication of navigational importance.

18. The vehicle of claim 17, wherein the third set of features includes a first set of aligned features and a second set of aligned features, and wherein determining the third set of feature further comprises:

determining the first set of aligned features based on the first attention map, the second value matrix, and the first set of features; and determining the second set of aligned features based on the second attention map, the first value matrix, and the second set of features.

19. The vehicle of claim 17, wherein the operations further comprise:

training at least one first machine learning model to determine the first set of features;

training at least one second machine learning model to determine the second set of features; and training, using the at least one first machine learning model and the at least one second machine learning model, at least one third machine learning model to determine the third set of features.

20. A non-transitory computer-readable medium storing instructions that, when executed by a processor, cause the processor to perform operations comprising:

determining, based on received sensor data, a first set of features for an area surrounding a vehicle;

determining, based on an occupancy map for the area surrounding the vehicle, a second set of features for the area surrounding the vehicle, wherein a first subset of the second set of features are each associated with an indication of navigational importance;

determining, using a query, key, value process, a first attention map for the first set of features and a second attention map for the second set of features, wherein the first attention map is determined based on a first query matrix and a first key matrix, and the second attention map is determined based on a second query matrix and a second key matrix; and determining, based on the first attention map and the second attention map, a third set of features that align the first set of features with the second set of features, wherein the third set of features align each of at least a second subset of the second set of features with at least one corresponding feature from the first set of features according to a ranking of the first set of features, wherein the ranking is based on whether a feature of the first set of features corresponds to a feature of the at least a second subset that is associated with the indication of navigational importance.

21. The non-transitory computer-readable medium of claim 20, wherein the third set of features includes a first set of aligned features and a second set of aligned features, and wherein determining the third set of feature further comprises:

determining the first set of aligned features based on the first attention map, the second value matrix, and the first set of features; and determining the second set of aligned features based on the second attention map, the first value matrix, and the second set of features.

22. The non-transitory computer-readable medium of claim 20, wherein the operations further comprise:

training at least one first machine learning model to determine the first set of features;

training at least one second machine learning model to determine the second set of features; and training, using the at least one first machine learning model and the at least one second machine learning model, at least one third machine learning model to determine the third set of features.

* * * * *